United States Patent [19]

Lewis et al.

[11] Patent Number: 5,858,446
[45] Date of Patent: *Jan. 12, 1999

[54] PROCESSED FRESH HERBS AND METHOD OF MAKING

[75] Inventors: Victor Marcus Lewis, Neutral Bay; David Adrian Lewis, Burraneer, both of Australia

[73] Assignee: Byron Australia Pty Ltd, Australia

[*] Notice: This patent issued on a continued prosecution application filed under 37 CFR 1.53(d), and is subject to the twenty year patent term provisions of 35 U.S.C. 154(a)(2).

[21] Appl. No.: 520,314

[22] Filed: Aug. 28, 1995

[30] Foreign Application Priority Data

Sep. 2, 1994 [AU] Australia ................. PM7927

[51] Int. Cl.$^6$ ................................. A23L 1/22
[52] U.S. Cl. .................... 426/615; 426/321; 426/324; 426/541; 426/542
[58] Field of Search .................... 426/640, 615, 426/650, 651, 654, 321, 324, 541, 542

[56] References Cited

U.S. PATENT DOCUMENTS

| | | | |
|---|---|---|---|
| 3,619,207 | 11/1971 | Dzurik | 426/321 |
| 4,572,836 | 2/1986 | Bakal . | |
| 4,957,749 | 9/1990 | Prieels et al. | 426/321 |
| 5,093,145 | 3/1992 | Darbonne et al. . | |

FOREIGN PATENT DOCUMENTS

| | | |
|---|---|---|
| 0 316 293 | 5/1989 | European Pat. Off. . |
| 1 348 266 | 5/1971 | United Kingdom . |
| 2 014 429 | 2/1979 | United Kingdom . |
| 2 011 775 | 7/1979 | United Kingdom . |

OTHER PUBLICATIONS

Baritaux et al. *Sciences des Aliments* 11; 49–62, 1991.
Paeaekkoenen, K. et al. *J. Food Sci.* 55; 1373–1377, 1990.
Gerhardt–U et al. Abstract of *Fleischerei* 34; 508–510, 1983.
Derwent Abs 7578995—abstracting DT 2424–273.
Derwent Abs 88211344—abstracting SU 1364–275–A.

*Primary Examiner*—Helen Pratt
*Attorney, Agent, or Firm*—Scully, Scott, Murphy & Presser

[57] ABSTRACT

The present invention is directed to a herb product comprising a comminuted herb admixed with water, a water activity controlling substance in sufficient amounts for the herb product to have a water activity less than 0.90 and an effective amount of an edible agent, said effective amount of an edible agent being an anti-oxidizing effective amount of an edible anti-oxidant or an anti-discoloring effective amount of an edible salt or mixture thereof, said herb product being present in a substantially oxygen-free atmosphere. In addition, the present invention is directed to a method of making the herb product and to food compositions containing same.

22 Claims, No Drawings

PROCESSED FRESH HERBS AND METHOD OF MAKING

BACKGROUND OF THE INVENTION

Culinary herbs together with aromatic plants such as ginger, garlic, peppers and chillies, are much prized ingredients in cooking. Fresh herbs are cultivated in home and commercial gardens and today are available fresh in many varieties. Herbs are used in the preparation of numerous traditional dishes and the aroma and color of various specific herbs are of great importance in these.

In most parts of the world, fresh herbs are seasonal. Herbs may be obtained year round in dried form. Most herbs when dried, however, lose their green color, aroma and flavor and are irreversibly altered so that they do not represent a satisfactory alternative to freshly picked herbs.

Many of the popularly used herbs contain enzymes which act very rapidly when the cell structure of the herb is disturbed resulting in loss of green color, production of dark pigments and both loss of fresh flavor and the development of off-flavors. These changes occur more rapidly at elevated temperatures such as occur in many food processing operations and in cooking. Amongst these herbs are basil, coriander (cilantro), oregano, tarragon and mint. Many studies have been made on the enzymic degradation of herbs including those by Baritaux et al., (Sciences-des-aliments 1911, 11, (1)49–62), Gerherdt, V. et al. (Fleischerei 34(5) 508–208). Studies have also been made on the drying and storage stability of dried herbs, including those by Mastrocola, D. et al. (Industrie-Alimentari, 1988 27(259 (341) and Paeaekkoenen, K., et al. (J Food Science 1990, 55(5)1373–1377).

Many herbs can be obtained nowadays in frozen and freeze-dried form. Frozen herbs have good flavor and color, but must be kept frozen and when thawed or used in cooking and in processed products are subject to the same enzymic action and color and flavor changes as fresh herbs. Freeze-dried herbs, which are expensive to produce, when wetted, suffer from the same enzyme action as frozen herbs.

The enzyme action in herbs can be prevented by blanching of the herbs in steam or hot water. In this way, the green color can be largely preserved but the flavor is often almost completely destroyed. Ricci in British Patent No. 1,348,266 (1974) describes production of a green food flavoring by heating basil leaves in hot water, quenching in cold water, cutting into pieces and refrigerating.

Herbs, along with other vegetables, for many ages have been traditionally preserved by pickling with salt or salt brine with or without vinegar. This method is used extensively in the pickle industry. Herbs treated in this way lose their attractive bright green color and much of the flavor is lost into the brine. Unless pasteurized these products are subject to surface molds and to salt and sugar tolerant yeasts. Coste (British patent 2,014,429, 1979) claims to have preserved chopped herbs by mixing with water activity controlling substances such as salt, glycerol and propylene glycol in such concentration that the water activity is less than 0.90. Oil up to 20% may be added to give a pasty consistency. We have observed that in following the procedures described by Coste, the resultant herb mixes developed quickly a dark olive green color. In the case of the herbs with high levels of polyphenol oxidase enzymes such as basil, mint and oregano the color that developed on storage was a dark greenish black. In all cases, the color changes were accompanied by off-flavors. Moreover, it was observed that even at water activities of 0.80, yeast and mold growth could occur on the surface of the mixes.

OBJECTS OF THE PRESENT INVENTION

An object of the present invention is to product a herb product with a natural bright fresh color and a fresh flavor that is convenient to use for culinary purposes and which can be stored and distributed on a year round basis.

A further object of the present invention is to product food products containing fresh herbs which are stored at refrigeration or freezer temperatures in a form suitable for convenient use that retain to a large extent both the color and the flavor of the fresh herbs and can be used by the consumer to impart to culinary products such as sauces, dressings, casseroles, soups and other dishes the fresh flavor and color of those herbs.

A further object of the invention is to product food products containing fresh herbs which may be suitably stored and distributed so that the aforementioned products and qualities can be available on a year-round basis.

A still further object of the invention is to product herb products which are adaptable to packaging in a range of quantities which vary from bulk industrial, smaller food service and retain unit size packs without any variation in quality in relation to the material used for such packaging.

A still further object of the invention is to produce herb products which when held at freezer temperature are sufficiently soft and fluid that they can be used directly from the freezer without thawing.

A still further object is to produce a herb product that may be pasteurized and suitably packaged to produce a product for use where pasteurized herbs are needed.

SUMMARY OF THE INVENTION

The invention according to a preferred form relates to a herb product comprising a comminuted herb admixed in the absence of oxygen with an effective amount of an edible agent, said effective amount of an edible agent being an anti-discoloring effective amount of an edible salt or anti-oxidizing effective amount of an edible anti-oxidant together with the addition of sufficient amounts of water activity controlling solutes as is necessary to bring the water activity of the product to 0.90 or lower. The resultant product is packaged and stored under substantially oxygen-free conditions.

Alternatively, the mixing may be preferred in the presence of air in an open mixer provided an oxygen scavenger is included in the mix.

DETAILED DESCRIPTION OF THE INVENTION

As used herein, the term "salt" refers to an edible salt. They include the edible Group IA metal salts. Examples include potassium chloride, sodium chloride, calcium chloride, sodium citrate, sodium lactate and the like. The preferred salt is sodium chloride. The salt, when present, is used for different purposes. It may be used as a water activity controlling colute or as a seasoning (see below). However, it is also used as an anti-discoloring agent. When used as an anti-coloring agent, the salt is preferably present in anti-discoloring effective amounts. The salts are preferably present in amounts ranging from about 3% to about 20% (w/w) but it is preferred that the salt level range from about 6% to about 14% (w/w).

As used herein the terms "antioxidant" and "oxygen scavenger" will be used interchangeably and will be considered synonymous. By the term "antioxidant", it is meant a preservative that specifically retards deterioration, rancidity or discoloration due to oxidation. Without wishing to be bound, it is believed that the anti-oxidant absorbs oxygen fom the system and thereby prevents the enzymic oxidation of the phenolic compounds present in the herbs. The antioxidants that are useful in the present application are oxygen or free radical scavengers that are normally added to foods, such as ascorbic acid or salts thereof, erythorbic acid or salts thereof and the like.

The amount of antioxidant used is an anti-oxidizing effective amount of the anti-oxidant. Preferably, it is less than 2% by weight, and most preferably it is present in amounts that range from about 0.2% to about 1% (w/w).

It is to be noted that the herb product contains water, but water is usually not added to the system. The fresh herb contains water, and this amount is generally sufficient for the purposes of the present invention. However, if required, additional water may be added to the herb product, especially when utilizing dry seeds.

Water activity is a measurement of the amount of water available for chemical reaction in foods, e.g., microbiological spoilage, hydration of colloids, enzyme activity, and the like. It is a measurement of the free water activity for chemical reactions. A higher water activity signifies that more free water is available, while a lower water activity indicates less free water is available. Obviously, the water activity is related to the amount of water present in the foods, but the relationship is quite complex and non-linear. In addition, water activity is dependent upon other factors, such as the amount and type of solids present in the food and the interaction of the solids with the water. Thus, even if two foods contain the same moisture content, the water activity would be different if the solid composition of the foods are different.

In the present invention, it is important to maintain the water activity below a certain level. For example, bacteria grows on food having water activity greater than 0.9. Thus, the water activity of the present herb product must be less than or equal to 0.90.

Water activity controlling solutes are those normally used in the food arts to control the water activity. Salt is an example of the water activity controlling solute. Thus, besides being an anti-discoloring agent, additional salt may be added as a water activity controlling solute. Examples include salts, such as the ones mentioned hereinabove. Again, the preferred salts are potassium chloride and especially sodium chloride.

Sugars are also water activity controlling solutes. Sugars include the common monosaccharides and the disaccharides. Examples are fructose, sucrose, dextrose, maltose, lactose and high conversion corn syrups, such as corn syrup solids, invert sugars, high fructose corn syrup (>55% fructose content, preferably about 90% fructose content) and the like. The preferred sugars are lactose, dextrose and maltose.

Other water activity controlling solutes include polyhydric alcohols, hydrolyzed protein and hydrolyzed starches. Preferred polyhydric alcohols are the sugar alcohols, especially the polydextrose sugar alcohols. Examples of polyhydric alcohols include, sorbitol, mannitol, xylitol, glycols such as glycerol, lower alkylene glycols containing 3–6 carbon atoms, such as propylene glycol and the like.

Hydrolyzed proteins come from vegetable proteins (such as soybean protein, wheat protein and the like) and animal protein (such as gelatin and whey and the like). Characteristic of hydrolyzed animal protein is that it contains a large amount of the sweet amino acids, like glycine, alanine, hydroxyproline and proline, whereas hydrolyzed vegetable protein is high in such amino acids as aspartic acid, leucine, isoleucine and valine. The term hydrolyzed protein also includes yeast extracts, especially autolysates.

As used herein, the term "herb" refers to the herbs normally used in the culinary arts for flavoring and human consumption. Included among the herbs in accordance with the present invention are basil, celery, celery seed, savory, tumeric, coriander (cilantro), cumin, green peppercorns, dill, oregano, tarragon, mint, marjoram, rosemary, parsley, cardamon, chives, chervil and other aromatic plants, such as red peppers, chillies, sweet bell pepper, garlic and ginger (collectively herein referred to as herbs). However, the entire plant material is not necessarily to be used in the present invention. It may be preferred that the leaves, flowers, barks, fruits, roots or other aromatic parts of the plants are normally used for culinary purposes. Therefore, unless specified to the contrary, the term "herb" will refer to the aromatic parts of these plants. If reference is required to the plant itself, the term "herb plant" will be utilized herein. The herb that is utilized herein may be either fresh or frozen.

In the present invention, it is preferred that the herb is chopped, cut, diced, pulverized or otherwise comminuted. In a preferred embodiment, the chopped herb is no larger than about 5×5 mm.

The herb products of the present invention are used for flavoring foods. Therefore, the present invention is also directed to a food composition containing the herb products of the present invention. Examples of foods containing the herb products of the present invention include sauces, including meat and tomato sauces, dairy products, such as cottage cheese, cream cheese, sour cream, gravy mixes, salad dressings, mustards and the like.

Therefore, the herb products of the present invention may additionally be admixed with adjuvants normally found in food products, such as pH controlling substances, such as sodium citrate, citric acid, and the like; emulsifiers and stabilizers, such as guar gum, lecithin, carrageenan, furcelleran, pectin, gellan, methyl cellulose, hydroxypropyl methyl cellulose, locust bean, tragacanth, xanthan, sodium carboxymethyl cellulose, and the like; vegetable oils, such as corn oil, soybean oil, olive oil, sunflower seed oil, safflower oil, canola oil, peanut oil and the like; essential oils (e.g., obtained by steam distillation or solvent extraction from odorous plants, such as clove, cinnamon, orange, lemon, lime, jasmine, rose, mint and the like); oleoresins; food acid flavorings, flavor enhancers (such as monosodium glutamate, 5'-ribonucleotides (such as 5'-inosine monophosphate and 2-methyl-3-hydroxy-4-(4H)-pyrone), and the like; preservatives, coloring agents, seasonings, such as salts (as, for example, the ones enumerated hereinabove) and the like.

For improving the organoleptic qualities or convenience in use, it is advantageous to add an edible oil to the mixture of herbs, water activity controlling solute and antioxidant and/or salt. The addition of oil does not substantially modify the water activity and does not adversely affect the preservation of the product, while giving it a pasty consistency. The addition of oil is preferably effected at about 0.1 to about 20 parts and more preferably from about 1 to about 10 parts of oil for 100 parts by weight of the herb product formed in accordance with the present invention.

The herb products of the present invention may also be admixed with meats and cheeses.

In preparing these stable herb products of the present invention, the herb plants should be freshly picked, well washed and kept cool. Succulent stems may be included with the leaves. Prepared quick-frozen herbs may also be used. With fresh herb plants, after washing, excess water is removed, for example, by blowing with an air stream or by centrifuging. They may then be reduced to particles of predetermined size, for example, by pulverizing or chopping in a cutter, slicer or dicer such as is common in the food industry. Some small leafed herbs, plants, for instance, thyme leaves, may be used in unchopped form. Throughout the process, the herb plants and herbs are preferably kept as cool as possible. The chopped or otherwise prepared herbs are then mixed with as little delay as possible with the salt or salts, the oxygen scavenger and the water activity controlling solutes. If a high enough concentration of salt is used, this may be sufficient to control the water activity to 0.90 or below, without the use of additional water activity controlling substances. Other food ingredients such as vegetable oil may also be added at this stage. Alternately, the mixture of whole or coarsely cut herbs and other ingredients may be chopped together in a single operation to any degree of comminution using suitable equipment such as a food processor with rotating sharpened blades equipped for operation under vacuum or inert gas. One typical piece of industrial equipment of this type if manufactured by the Stephan Co., Hameln, Germany.

The mixing or combined mixing and chopping operation are preferably performed under conditions which subject the ingredients to as little oxygen as possible and preferably in a substantially oxygen-free atmosphere, and most preferably in an oxygen-free atmosphere. This is best achieved either in an inert gas such as nitrogen or under vacuum. It can, however, be performed in an open mixer provided the oxygen scavenger is added. In this case the mixture should preferably be vacuum de-aerated after mixing.

During mixing, the solutes dissolve in water extracted from the herb plants and form a flowable liquid mix. It is therefore usually unnecessary to add any water. However, if necessary, water may be added.

After mixing, the herb mix is packaged in sealed glass jars or other low oxygen transmission packages such as flexible laminates, metal or plastic tubes etc. In smaller containers for consumer use it is preferred that the type of package be such that the contents can be squeezed out and re-sealed (e.g. a metal tube) so that air is kept to a minimum within the package. The packaged product is held at low temperature, preferably between 8° C. and −20° C. and more preferably at −20° C.

The herb products prepared as outlined above may be pasteurized in a heat exchanger in the absence of oxygen and either cooled and aseptically packaged or packed hot into low oxygen transmission containers and rapidly cooled after the package is sealed. Such pasteurized packs have good color retention and flavor though not as good as the unheated products. They may be used where a pasteurized product is needed, for example for addition to dairy products.

The present invention relates to products in which the color of culinary herbs together with their fresh flavor can be retained for an extended period of time. While all herbs will benefit from this invention, those herb plants which contain particularly active enzyme systems which lead to rapid color deterioration and associated flavor changes benefit to an even greater degree. The present invention relates not only to herb plants such as basil, oregano, coriander, tarragon and mint which oxidize very quickly but is also equally beneficial for other herb plants such as parsley, chives, garlic and ginger.

It has been found that by incorporating the following components or conditions jointly into the processing of these herb plants, a very superior product can be prepared.

1. Edible salts such as sodium chloride or potassium chloride assist in preventing the rapid discoloration and flavor change of the herb. While a salt concentration as low as 3% retards discoloration a salt level as high as 20% has a more pronounced and lasting effect on maintaining color and flavor. Since these herb preparations are used at a low level in the recipe as consumed, for instance about 2 to 5%, the salt carry-over into the dish is low, usually not more than one half of one percent.

2. When the mixing procedure is not performed under inert gas or vacuum or when salt is not added, the addition of ascorbic acid, sodium ascorbate, erythorbic acid or other similar antioxidants with the herbs achieves color and flavor retention. The level of the antioxidant used would normally be below 2%, most usually between 0.2 and 1.0%. Even when mixing is performed in the substantial absence of oxygen, the use of the oxygen scavenger is often advantageous.

3. To achieve prolonged maintenance of color and flavor, the mixture of herbs, salt and anti-oxidant must be protected from oxidation by packaging so that minimal exposure to oxygen can occur. This can be achieved by packaging in sealed containers of glass or metal, or in flexible packages with low oxygen permeability.

Since the herb product of the present invention is packaged under anaerobic conditions, to avoid spoilage it must be maintained at a water activity below 0.90, preferably below 0.85 and more preferably between about 0.65 and 0.90, inclusive and most preferably about 0.80 to 0.90 inclusive. This may be achieved by maintaining a sufficiently high level of sodium chloride (10–20%) or by adding to the mixture other water activity controlling solutes such as sugars, polyhydric alcohols or other salts. Where sugar additions are used to control the water activity, those sugars with a low sweetness level such as lactose, dextrose and maltose are preferred.

The mixture, to ensure good shelf-life should be kept cool below 8° C. and preferably under freezer conditions (about −20° C.). The choice of salt concentration and that of other water activity controlling solutes can be made so that even at −20° C., the mixture will maintain its fluidity, will not freeze, and can be used directly out of the freezer without thawing. It has been found that if the herb production of the present invention has a water activity of about 0.90 or less, ice crystals will not usually develop in the product and fluidity will be maintained. Herb products prepared as outlined above will maintain their fresh color and flavor for in excess of twelve months.

The herb products prepared as described above may be used in the preparation of a range of herb-based sauces which are preferably prepared without heating at water activities about 0.85. These sauces are packed in packages with minimal exposure to oxygen and are preferably stored at freezer temperature for long shelf-life. If a combination of salt and/or other water activity controlling solutes are used to arrive at a water activity about 0.85, the products remain fluid or spoonable at freezer temperatures. In the preparation of these sauces, it is often desirable to add a proportion of up to about 50% of an edible oil. The oil generally improves the flow characteristics of the product, partially dissolves and assists in stabilizing the essential herb oils and assists in the blending of these flavors in culinary preparations. It is preferred to use an oil which does not solidify at freezer temperatures. One such oil is sunflower seed oil, but other oils such as safflower and corn oil have also been found suitable. In preparing sauces with edible oils, the use of emulsifying agents such as polyoxyethylene sorbitan esters of fatty acids, monoglycerides, lecithin and sugar esters may be found necessary.

These herb preparations and herb based sauces may be used on cooked pasta, rice or vegetables, in salad dressings, in other recipes where a fresh herb flavor or color is desired, in cottage cheese mixes and many other prepared foods.

Unless specified to the contrary, the percentages used herein refer to weight percentages.

The invention will now be described with reference to the following non-limiting examples.

EXAMPLE 1: BASIL

Fresh basil leaves were washed and chopped in a kitchen type food processor with the ingredients listed below for about 60 seconds or until the size of the leaf particles was about 1.5×1.5 mm.

|  | % by weight |
|---|---|
| Basil leaves | 70.7 |
| Salt | 14.0 |
| Dextrose | 14.0 |
| Citric acid | 0.3 |
| Guar gum | 0.3 |
| Sodium erythorbate | 0.7 |

The resultant paste was transformed to a container and placed in a vacuum chamber which was evacuated several times to remove entrapped air. The basil paste had a water activity of 0.80. It was packed into low-oxygen-transmission clear laminated pouches holding about 150 g each.

These were sealed to eliminate as much air as possible. Some of the packs were stored at −20° C., others at 6° C. After 4 weeks the basil stored at 6° C. was just a shade darker than that stored at −20° C. After 4 months it was noticeably darker but still a bright green. The product at −20° C. was equally as bright as when first made and had a typical fresh basil flavor.

EXAMPLE 2: TARRAGON

Fresh washed tarragon leaves were chopped in a kitchen food processor which had been fitted with a plastic sleeve on the top opening so that nitrogen gas could be flowed through the processor during chopping. The leaves were chopped for about 60 seconds with the following ingredients:

|  | by weight |
|---|---|
| Tarragon leaves | 50.7 |
| Emulsifier (sugar ester) | 0.3 |
| Salt | 10.0 |
| Lactose | 11 |
| Dextrose | 11 |
| Sunflower oil | 16.7 |
| Guar gum | 0.3 |

The product had a water activity of 0.86. The viscous emulsion was packed into aluminum tubes and the ends sealed. The tubes were stored at −20° C. For use, the screw cap was removed from the tube and a quantity of the emulsion squeezed out. Even though stored at −20° C., the product was still fluid. After use, the tube was resealed with the cap so that a negligible quantity of air was entrapped. After twelve months, the color and flavor of the tarragon had not noticeably changed.

EXAMPLE 3: GARLIC

Garlic cloves were peeled of their outer membranes and chopped in a kitchen food processor for 2 minutes with the following ingredients.

|  | % by weight |
|---|---|
| Garlic | 70.5 |
| Salt | 9.5 |
| Whey powder | 9.5 |
| Ascorbic acid | 0.2 |
| Citric acid | 0.3 |
| Sunflower oil | 10.0 |

The resultant paste had a water activity of 0.84. It was packed into plastic tubes which had been made from an opaque laminate containing aluminum foil as an oxygen barrier. These were stored under refrigeration at 6° C. After 12 months the creamy white color of the paste had not deteriorated and the flavor was typical of fresh garlic.

EXAMPLE 4: PESTO WITH BASIL

A pesto sauce was prepared from fresh basil leaves by chopping all of the following ingredients together in a Stephan UMC Cutter (A Stephan U Sohne, Hameln, Germany) equipped for vacuum cutting and mixing:

|  | % by weight |
|---|---|
| Basil leaves | 29.1 |
| Citric acid | 0.2 |
| Salt | 6.0 |
| Whey powder | 8.1 |
| Guar gum | 0.3 |
| Black pepper | 0.3 |
| Pine nuts | 11.0 |
| Fresh garlic | 8.5 |
| Parmesan cheese | 8.5 |
| Sunflower seed oil | 28.0 |
|  | 100.0 |

The mix was cut under vacuum until a fine emulsion was obtained. The water activity of the mix was 0.85. The product was packed into 100 g pouches made from low oxygen transmission material and sealed to avoid air. The pouches were stored at −20° C. For use, the entire content of the pouch which was still fluid at −20° C., was mixed with 250 gram of dry pasta which had been cooked in unsalted water.

EXAMPLE 5: MINT

Freshly picked mint leaves were washed, spin-dried and mixed with the following ingredients:

|  | % by weight |
|---|---|
| Mint leaves | 50 |
| Dextrose | 11 |
| Whey powder | 15 |
| Glycerol | 10 |
| Guar gum | 0.2 |
| Sodium erythorbate | 0.8 |
| Sunflower seed oil | 13 |

The mixture was chopped under a nitrogen stream as in example 2 for 60 seconds. The product had a water activity of 0.84. It was packed into low oxygen transmission plastic bags which were sealed so as to minimize any headspace air and stored at −20° C. After 12 months storage, there was no appreciable deterioration in color or flavor.

The above preferred embodiments and examples are given to illustrate the scope and spirit of the present invention. The embodiments and examples described herein will make apparent to those skilled in the art other embodiments and examples. These other embodiments and examples are within the contemplation of the present invention. Therefore, the present invention should be limited only by the appended claims.

What is claimed is:

1. A fluid and color and flavor stable herb product comprising a comminuted fresh herb admixed with a water activity controlling solute in sufficient amounts for the herb product to have a water activity less than or equal to 0.90 and an effective amount of an edible agent, said effect amount of an edible agent being an anti-oxidizing effective amount of an edible anti-oxidant or an anti-discoloring effective amount of an edible salt or mixture thereof, said herb product being present in a substantially oxygen-free atmosphere and remaining fluid at a temperature between 8° C. and −20° C., said herb product substantially retaining both the color and flavor of the fresh herb.

2. The herb product according to claim 1 wherein the water activity ranges from 0.65 to 0.90.

3. The herb product according to claim 2 wherein the water activity ranges from 0.80 to 0.90.

4. The herb product according to claim 1 wherein the salt is a Group IA metal edible salt.

5. The herb product according to claim 4 wherein the salt is sodium chloride, potassium chloride, calcium chloride, sodium citrate or sodium lactate.

6. The herb product according to claim 1 wherein the anti-oxidant is ascorbic acid, erythorbic acid or salts thereof.

7. The herb product according to claim 1 wherein the water activity controlling solute is an edible salt, a sugar, a sugar alcohol, hydrolyzed starch or hydrolyzed protein.

8. The herb product according to claim 7 wherein the water activity controlling solute is sodium chloride, potassium chloride, dextrose, maltose, hydrolyzed starch or hydrolyzed whey.

9. The herb product according to claim 1 which additionally comprises an adjuvant, meat or cheese or mixture thereof.

10. The herb product according to claim 9 wherein the adjuvant is a pH controlling substance, an emulsifier, a flavor enhancer, a food acid flavoring agent, preservative, vegetable oil, essential oil, oleoresin or mixture thereof.

11. A food composition comprising the herb product of claim 1.

12. A method for preparing a fluid and color and flavor stable herb product which comprises admixing, without heating, a comminuted fresh herb with an effective amount of an edible agent in the absence of air in the presence of a water activity controlling solute in sufficient amounts so that the water activity of the herb product is less than or equal to 0.90, said effective amount of an edible agent being an anti-oxidizing effective amount of an edible antioxidant or anti-discoloring effective amount of an edible salt, or mixture thereof and storing the resulting herb product in a substantially oxygen-free atmosphere at refrigerator or freezer temperature, said resulting herb product remaining fluid at a temperature of between 8° C. and −20° C., said herb product substantially retaining both the color and flavor of the fresh herb.

13. A herb product prepared in accordance with the method of claim 12.

14. The method according to claim 12 wherein the herb is comminuted in the presence of said edible agent and the water activity controlling solute.

15. A method for preparing a fluid and color and flavor stable herb product comprising (a) admixing, without heating, a comminuted herb with an anti-oxidizing effective amount of an edible anti-oxidant in the presence of a water activity controlling solute in sufficient amounts so that the water activity of the herb product is less than or equal to 0.90; (b) then deaerating the product of (a) and (c) storing the resulting herb product in a substantially oxygen-free atmosphere at refrigerator or freezer temperature, said resulting herb product remaining fluid at a temperature of between 8° C. and −20° C., said herb product substantially retaining both the color and flavor of the fresh herb.

16. The method according to claim 12 or 15 wherein the water activity controlling solute is present in an amount sufficient so that the water activity ranges from 0.80 to 0.90, inclusive.

17. The method according to claim 12 wherein the salt is sodium chloride, potassium chloride, calcium chloride, sodium citrate or sodium lactate.

18. The method according to claim 12 or 15 wherein the anti-oxidant is ascorbic acid, erythorbic acid or salts thereof.

19. The method according to claim 12 or 15 wherein the water activity controlling solute is an edible salt, sugar, sugar alcohol, hydrolyzed starch or hydrolyzed protein.

20. The method according to claim 12 or 15 which additionally comprises associating the herb product with meat, cheese, a pH controlling substance, an emulsifier, flavor enhancer, coloring agent, preservative, vegetable oil, oleoresin, essential oil or mixture thereof.

21. A herb product prepared in accordance with the method of claim 15.

22. The method according to claim 15 wherein the herb is comminuted in the presence of said edible anti-oxidant and the water activity controlling solute.

* * * * *

UNITED STATES PATENT AND TRADEMARK OFFICE
CERTIFICATE OF CORRECTION

PATENT NO. : 5,858,446
DATED : January 12, 1999
INVENTOR(S) : Victor M. Lewis

Page 1 of 1

It is certified that error appears in the above-identified patent and that said Letters Patent is hereby corrected as shown below:

Column 2,
Line 45, "preferred" should read -- prepared --
Line 58, "colute" should read -- solute --

Column 5,
Line 22, "if" should read -- is --

Column 9,
Line 17, "effect" should read -- effective --

Signed and Sealed this

Eighteenth Day of December, 2001

Attest:

JAMES E. ROGAN
Attesting Officer  Director of the United States Patent and Trademark Office